No. 699,622. Patented May 6, 1902.
E. KEMPSHALL.
MANUFACTURE OF PLAYING BALLS.
(Application filed Jan. 29, 1902.)
(No Model.)

Witnesses:
Calderon C. Fuss
F. E. Maynard.

Inventor
Eleazer Kempshall
By his Attorney.
F. H. Richards.

UNITED STATES PATENT OFFICE.

ELEAZER KEMPSHALL, OF BOSTON, MASSACHUSETTS, ASSIGNOR TO THE KEMPSHALL MANUFACTURING COMPANY, A CORPORATION OF NEW JERSEY.

MANUFACTURE OF PLAYING-BALLS.

SPECIFICATION forming part of Letters Patent No. 699,622, dated May 6, 1902.

Application filed January 29, 1902. Serial No. 91,691. (No model.)

*To all whom it may concern:*

Be it known that I, ELEAZER KEMPSHALL, a citizen of the United States, residing in Boston, in the county of Suffolk and State of Massachusetts, have invented certain new and useful Improvements in the Manufacture of Playing-Balls, of which the following is a specification.

This invention relates to springy playing-balls, and especially to those to which it is desired to impart great momentum, so that they may fly a long distance.

The object of my invention is to minimize the distortion of the ball by a blow, so as to avoid waste of driving force in changing and restoring its shape. I also aim to produce a ball having uniform action, so that a given blow may always produce the same result, and also possessing a high degree of liveliness.

Figure 1:
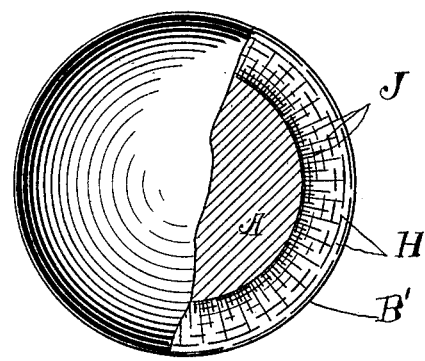
Figure 2:
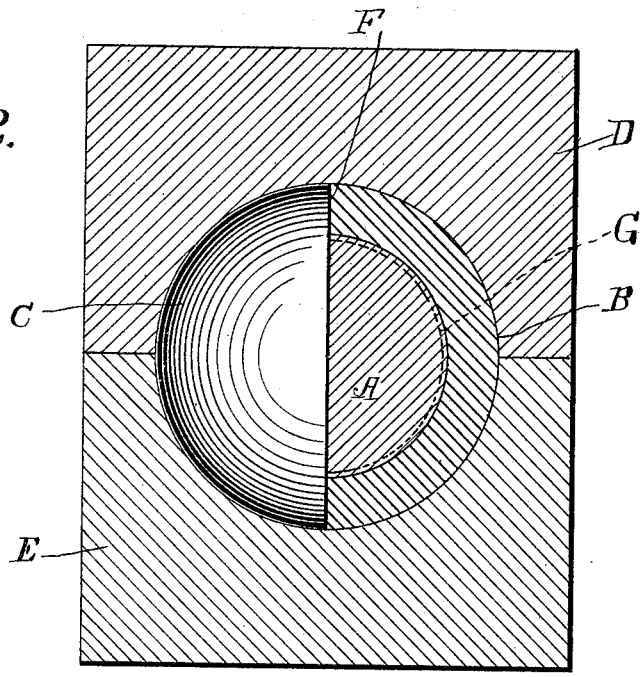

In the drawings forming part of this specification, Figure 1 is a view of a ball made in accordance with my improvements and partly broken away so as to exhibit its construction. Fig. 2 illustrates a stage in its manufacture.

In the views similar parts are designated by similar letters of reference.

Upon a compressible resilient core A, I place hemispherical sections of uncured soft rubber B and C, and the parts thus assembled I inclose in sections D and E of the metallic mold. These sections, while held firmly together in any convenient way, are subjected to sufficient heat to vulcanize or cure the rubber and cause the segments to join or weld at F, the edges thereof having first been prepared for adhesion, if desired. During the vulcanizing process the rubber expands somewhat in bulk, and the mold D E being made tight the rubber in expanding acts upon the core, slightly compressing the same, as indicated diagrammatically by a dotted circle G. Commercial gutta-percha of coarse quality may be used for the core, since it is somewhat porous, whereby the same is compressible in bulk. Material for the core, whether gutta-percha or other substance, may have sufficient porosity or be otherwise sufficiently compressible for the purpose. It is customary to mix foreign materials with rubber or with gutta-percha prior to forming articles therefrom, and any suitable mixture may be prepared for the purpose of enabling the core to be reduced in bulk by the pressure exerted thereon by the vulcanizing rubber. Upon removing the ball from the mold the resilient but compressed core A tends to recover its bulk, and hence expands the yielding rubber envelop B', Fig. 1, thereby stretching said envelop throughout, as indicated diagrammatically by broken curved lines at H. It will also be understood that the longitudinal tension of the exterior portion of said envelop has the effect of compressing the interior portion thereof, as indicated by radial lines J, while owing to the resistance of the entire envelop to distortion or expansion the core A is still held under a degree of compression.

For the core A, I recommend a gutta-percha of such a consistency that its bulk may be compressed. Other material, however, may be used, such as firm highly-vulcanized rubber in such form or of such consistency as to be compressible in bulk.

It will be perceived that the material of the entire ball from center to periphery is in an abnormal condition, the core being under compression and the envelop being both compressed and longitudinally tensioned, so that an extraordinary degree of efficiency is attained, every affected particle of the ball acting with promptness and vigor in response to a blow. Although the outer part of the shell or jacket is in a soft condition and effectually cushions the blow of an implement, still the effect of a blow is different from the effect upon a ball having a uniform softness of texture throughout. In the latter case a severe blow would violently distort the ball instead of giving the same impetus, whereas in my ball the softness resides only at the surface, and as soon as this slight resistance is overcome a high resistance is met, due to the presence of the relatively hard solid core, which not only itself absorbs momentum from the implement, but also by reason of its solidity prevents undue distortion of the ball, so that nearly all of the force going from the implement to the ball is utilized to impart velocity thereto. It will also be understood that under the shock of a blow the solid core is slightly displaced from its true central position, thereby affecting somewhat the material of the envelop at the opposite side of the ball from the implement, and also affecting other portions of the envelop, so that almost if not all the material of the envelop is called into action and instantly reacts, thereby imparting a high degree of activity or liveliness to the ball and causing the same to leave the implement at high velocity. Only a slight distortion is produced at any portion of the ball, whose entire mass is thus rendered active in restoring the ball to its original spherical shape, and hence in reacting against the implement. It will be understood that the result of a blow will depend upon the velocity and weight of the implement, as well as upon the weight of the ball, the depth of the depression produced in the ball, and especially upon the ratio of increase in resistance offered thereby. In this instance this ratio is very high, the ball feeling quite soft to a light touch, but offering a hard resistance to pressure. The ball thus has practically all the desirable qualities of the usual soft-rubber ball, and also a phenomenal flying or carrying power. Owing to the rapidly-increasing resistance even a heavy blow effects only a slight distortion of the envelop and that only over a small area thereof, so that very little force is absorbed in changing and rechanging the form of the ball. Moreover, the period during which the driver may continue to deliver power into the ball itself is increased, with the result of giving to the ball a longer flight. The compressed core not only retains the envelop in an expanded state, but also supports the same when struck, and by the combined elasticity of core and envelop an extremely active and powerful ball is produced. By having the interior of the rubber envelop or coating in a state of compression while the outer portion is in a state of longitudinal tension, the efficiency of the ball is improved and the envelop is not merely an inert portion having no force or tension except that which is directly caused by a driver.

In my elastic envelop the tension is in all directions around the circumference of the ball, and hence the activity of all of the particles of the rubber envelop is fully developed, or, in short, the ball carries no dead-weight.

Modifications and variations may be resorted to within the scope of my invention. The claims herein are intended to cover a ball whether considered as complete and ready for use or as incomplete and intended only for the nucleus or filling of a larger ball. One of the principal distinctions between my envelop and the common wound balls resides in the fact that in the latter the rubber at any part is tensioned in only one direction—viz., longitudinally—while in my elastic envelop the tension at any point is in all directions circumferentially of the ball.

Having described my invention, I claim—

1. A process in producing a playing-ball, consisting in curing a thick rubber envelop upon a compressible core, so that the expansion of the rubber in the curing process condenses said core, and also so that when the ball is removed from the mold said core recovers at least partially its original bulk and places said envelop under tension.

2. A process in producing a playing-ball, consisting in curing a rubber envelop upon a compressible core of gutta-percha, so that the expansion of the rubber in the curing process condenses said core, and also so that when the ball is removed from the mold said core recovers at least partially its original bulk and places said envelop under tension.

ELEAZER KEMPSHALL.

Witnesses:
B. C. STICKNEY,
JOHN O. SEIFERT.